Dec. 4, 1923.
F. L. MORGAN
1,476,095
STOCK WATERING APPARATUS
Filed May 18, 1923   2 Sheets-Sheet 1
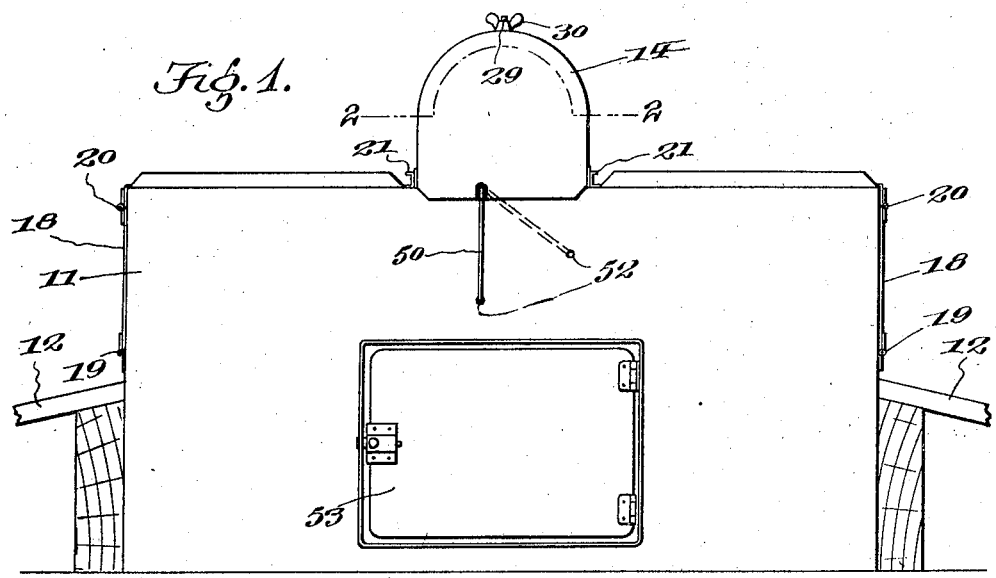
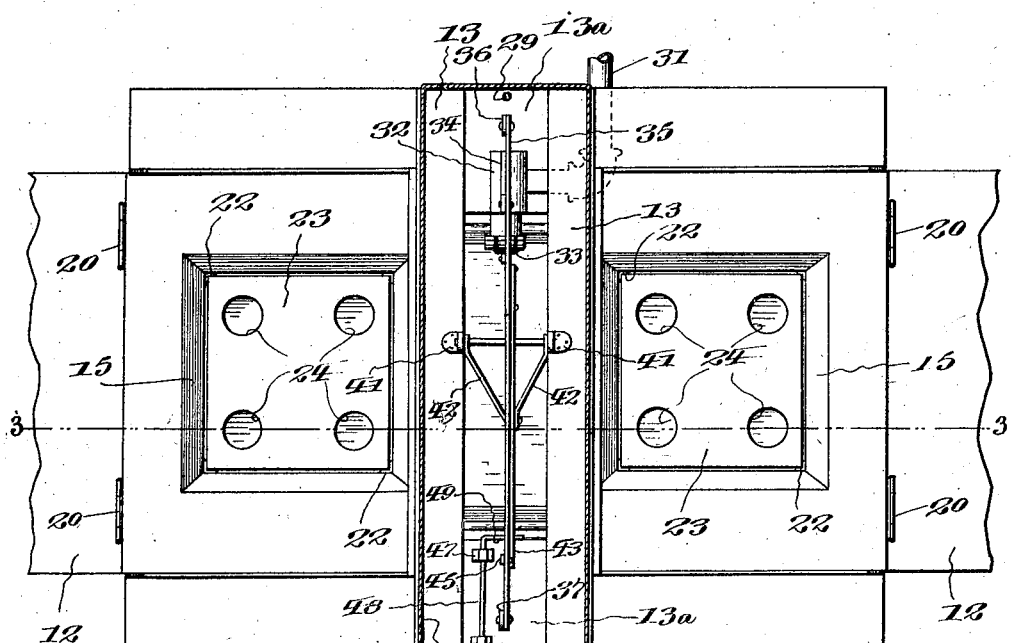
Inventor:-
Francis L. Morgan
By Milo B. Stevens & Co.
Attorneys.

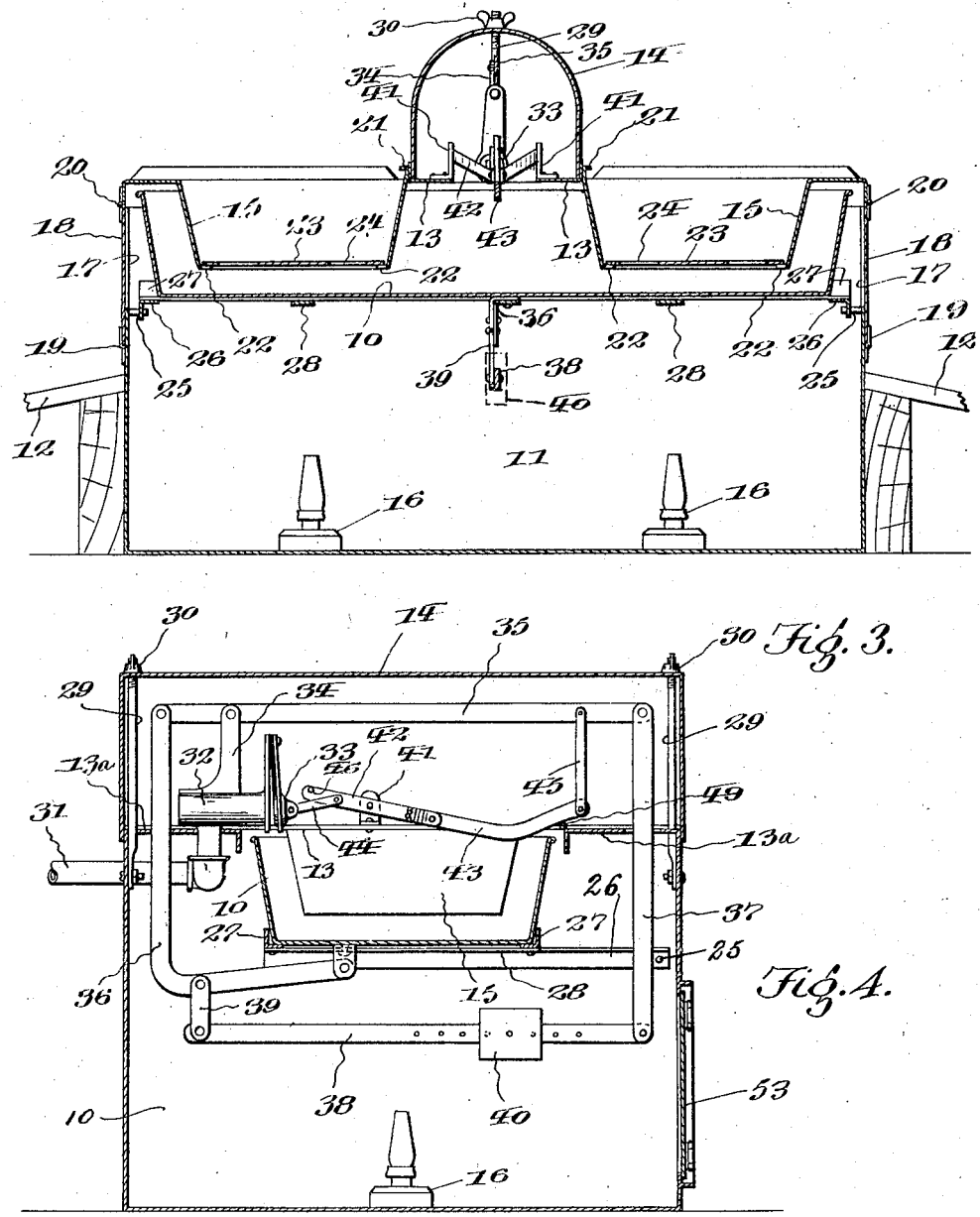

Patented Dec. 4, 1923.

1,476,095

UNITED STATES PATENT OFFICE.

FRANCIS L. MORGAN, OF WASHINGTON, IOWA.

STOCK-WATERING APPARATUS.

Application filed May 18, 1923. Serial No. 639,922.

*To all whom it may concern:*

Be it known that I, FRANCIS L. MORGAN, a citizen of the United States, residing at Washington, in the county of Washington and State of Iowa, have invented new and useful Improvements in Stock-Watering Apparatus, of which the following is a specification.

This invention relates to apparatus for supplying stock, poultry, etc., with drinking water, and more particularly to an apparatus of this kind in which a supply of water is automatically maintained by having the water receptacle tiltably supported and connected to a water supply in such a manner that its tilting or downward movement when it becomes filled causes the valve to close, whereas when the receptacle rises as it becomes empty, the valve opens so that the water again flows into the receptacle.

The invention has for its object to provide an apparatus of the kind stated embodying certain novel and improved features of construction and modes of operation to be described in detail hereinafter, and in order that the same may be better understood, reference is had to the accompanying drawings, wherein—

Figure 1 is a side elevation of the apparatus;

Fig. 2 is a plan view thereof, partly in section, the plane of the section being denoted by the line 2—2 in Fig. 1;

Fig. 3 is a longitudinal section on the line 3—3 of Fig. 2, and

Fig. 4 is a central transverse section.

Referring specifically to the drawings, the water receptacle 10 and the valve-control mechanism are enclosed in a housing 11 which is approached at its opposite ends by runways 12 for the animals using the apparatus. The side walls of the housing, intermediate the ends thereof, and at the top, are connected by two parallel and spaced cross strips 13 connected at their ends by plates 13ª, on which strips is removably seated a hood 14, and in the open space on opposite sides of the hood are located funnels 15 which depend into the receptacle 10 through the open top thereof so as to dip into the water in the receptacle and thus prevent drafts of air entering the housing and blowing out the lamps (shown at 16) located in the housing. These lamps seat on the bottom of the housing and they are located below the receptacle 10 to prevent freezing of its contents in cold weather.

The end walls of the housing 11, are provided with openings 17 provided with hinged doors 18, the hinge connections 19 being at the bottom. One funnel 15 is hinged or otherwise pivotally connected, as shown at 20, to the top of one of the doors, and the other funnel is similarly connected to the other door. The water receptacle 10 is in line with the openings 17, and hence by swinging either funnel 15 upwardly out of the receptacle, and the door 18 to which it is connected outwardly, the receptacle may be removed from the housing through the now uncovered opening 17. The funnel at the other ends of the housing must also be swung upwardly out of the water receptacle. To facilitate this manipulation of the funnels, they are provided with hand holds 21.

Each funnel 15 has inwardly extending corner pieces 22 at the bottom to support removable plates 23 having openings 24. These plates are for the purpose of preventing injury to the receptacle 10 by attempts of animals to force their mouth or feet entirely through the funnels.

To the end walls of the housing 11, are pivoted at one end, as shown at 25, angle bars 26 connected by longitudinal bars 27, which latter, in turn, are connected by cross strips 28. These parts form a pivoted supporting frame for the receptacle 10, the same seating removably thereon.

The hood 14 is held down in place on top of the housing 11 by threaded rods 29 and wing nuts 30, the rods being secured to the side walls of the housing.

A water supply pipe 31 enters the housing 11 through the rear side wall thereof, and is connected to a cylindrical spout 32 carrying at its outlet end a hinged valve 33 for controlling the discharge from the spout, the outlet or mouth thereof being positioned to discharge into the water receptacle 10.

From the top of the spout 32 rises a standard 34 to which is fulcrumed, intermediate its ends, a lever 35 positioned above the receptacle 10. One end of the lever 35 is connected by an angular link 36 to the hinged supporting frame of the receptacle 10, and the other end of said lever is connected by a straight link 37 to one end of a lever 38 positioned below the receptacle and that end of the link 36 which is connected to the supporting frame of the receptacle. The other end of the lever 38 is connected by a fulcrum link 39 to the last mentioned portion of the link 36. On the lever 38 is adjustably mounted a counterweight 40.

The top strips 13 carry bearing standards 41 to which are pivoted laterally extending arms 42 of a lever 43, one end of said lever having a link connection 44 with the valve 33, and the other end of the lever being connected by a link 45 to the lever 35 at a point adjacent to the end to which the link 37 is connected. Fig. 4 shows one of the arms 42 partly broken away. The end of the lever 43 which is connected to the link 44 has a side lug 46 adapted to engage the top edge of said link when the valve 33 is closed, whereby said lever and link are prevented from passing a dead-center position. It will be noted that the lever 43 and the link 44 operate similar to a toggle, and when they are in alinement the valve 33 is closed, whereas when they swing out of alinement, the valve is pulled open.

When the receptacle 10 does not contain enough water to overbalance the weight 40, the latter, through the lever 38 and the various links and levers connecting the same with the pivoted receptacle support, causes the supporting frame to rise, and as the end of the lever 35 which is connected by the link 45 to the lever 43 now descends, said link 45 swings the lever 43 in such a direction that through the link 44 the valve 33 is pulled open. Water now flows into the receptacle, and as it fills the same and overbalances the weight 40, the supporting frame of the receptacle tilts downwardly, whereupon the valve operating members move in a direction opposite to that just described, with the result that the lever 43 and the link 44 straighten out or swing into alinement, so that the valve 33 closes. When enough water in the receptacle has been used up so that it no longer overbalances the weight 40, the receptacle supporting frame rises and the first-mentioned operation whereby the supply is replenished, is repeated.

In order to permit removal of the receptacle 10 for cleaning or other purposes, without leaving the water turned on, there is journaled in bearings 47 on one of the plates 13ª, a rock shaft 48 having at its inner end a lateral bend 49 extending beneath the lever 43, so that when the rock shaft is turned in the proper direction, the bend pushes up against the lever 43 and swings it in a direction to close the valve 33. The rock shaft extends from the housing and has adjacent to one of the side walls thereof a lateral bend 50 serving as an actuator handle. The extremity of the handle bend has a slight inward turn 51, and the housing wall has two angularly spaced apertures 52 into either one of which the part 51 is adapted to be sprung to lock the rock shaft, it being understood that the bend 50 is resilient and has a normal tendency to swing toward the housing wall having the apertures 52. Thus, the rock shaft may be securely locked in valve-closing position, and also in the position when the bend 50 is retracted.

One of the side walls of the housing 11 has an opening provided with a door 53 for ready access to the interior of the housing to adjust the weight 40 on the lever 38, and also for access to the lamps 16. The valve control mechanism is readily accessible upon removal of the hood 14.

I claim:

1. In a watering apparatus, a housing having an end opening, a closure for said opening, a water receptacle positioned in the housing for removal through said opening, a depressible support on which the receptacle removably seats, a water supply having an outlet into the receptacle, a valve for said outlet, a weighted lever having a connection with the support, and a connection between said lever and the valve for controlling the same.

2. In a watering apparatus, a housing having an end opening, a closure for said opening, a water receptacle positioned in the housing for removal through said opening, a water supply having an outlet into the receptacle, a valve for said outlet, a depressible counterbalanced support for the receptacle on which the latter removably seats, and a valve-controlling connection between said receptacle support and the valve.

3. In a watering apparatus, a housing having an end opening, a closure for said opening, a water receptacle positioned in the housing for removal through said opening, a water supply having an outlet into the receptacle, a valve for said outlet, a depressible counterbalanced support for the receptacle on which the latter removably seats, a valve-controlling connection between said receptacle support and the valve, and means for locking said connection in valve-closing position.

4. In a watering apparatus, a depressible support, a water receptacle carried by the support, a water supply having an outlet into the receptacle, a valve for said outlet, a valve controlling connection between the support and the valve, and means for locking said connection in valve-closing position.

5. In a watering apparatus, a housing having an end opening, a closure for said opening, a water receptacle positioned in the housing for removal through said opening, a depressible support on which the receptacle removably seats, a water supply having an outlet into the receptacle, a valve for said outlet, a weighted lever having a connection with the support, a connection between said lever and the valve for controlling the same, and means engageable with the last-mentioned connection for locking the valve in closed position.

6. In a watering apparatus, a depressible support, a water receptacle carried by the support, a water supply having an outlet into the receptacle, a valve for said outlet, a lever, a pair of toggle members one of which is connected to the valve, a connection between the other toggle member and the lever, a second lever, a counterweight carried by the second lever, a link connection between one end of the first-mentioned lever and the receptacle support, a link connection between the other end of the first mentioned lever and one end of the second lever, and a fulcrum-link connection between the other end of the second lever and the first mentioned link connection.

7. In a watering apparatus, a depressible support, a water receptacle carried by the support, a water supply having an outlet into the receptacle, a valve for said outlet, a lever, a pair of toggle members one of which is connected to the valve, a connection between the other toggle member and the lever, a second lever, a counterweight carried by the second lever, a link connection between one end of the first-mentioned lever and the receptacle support, a link connection between the other end of the first-mentioned lever and one end of the second lever, a fulcrum-link connection between the other end of the second lever and the first-mentioned link connection, and means engageable with one of the toggle members for swinging the same to lock the valve in closed position.

8. In a watering apparatus, a depressible support, a water receptacle carried by the support, a water supply having an outlet into the receptacle, a valve for said outlet, a lever, a pair of toggle members one of which is connected to the valve, a connection between the other toggle member and the lever, a second lever, a counterweight carried by the second lever, a link connection between one end of the first-mentioned lever and the receptacle support, a link connection between the other end of the first-mentioned lever and one end of the second lever, a fulcrum-link connection between the other end of the second lever and the first-mentioned link connection, and a rock shaft having a lateral arm engageable with one of the toggle members for swinging the same to lock the valve in closed position.

9. In a watering apparatus, a depressible support, a water receptacle carried by the support, a water supply having an outlet into the receptacle, a valve for said outlet, a lever, a pair of toggle members one of which is connected to the valve, a connection between the other toggle member and the lever, means for limiting the swing of the toggle members in one direction, a second lever, a counterweight carried by the second lever, a link connection between one end of the first-mentioned lever and the receptacle support, a link connection between the other end of the first-mentioned lever and one end of the second lever, and a fulcrum-link connection between the other end of the second lever and the first mentioned link connection.

10. In a watering apparatus, a housing, a water receptacle in the housing, and a funnel carried by the housing and depending into the receptacle, through which funnel access is had to the receptacle, the housing having an opening through which the receptacle is removable, and the funnel being pivoted to swing out of the receptacle clear of the same.

11. In a watering apparatus, a housing having an opening, a pivoted closure for the opening, a water receptacle positioned in the housing for removal through the opening, and a funnel depending into the receptacle, through which funnel access is had to the receptacle, the funnel being pivoted to the closure to swing out of the receptacle clear of the same.

In testimony whereof I affix my signature.

FRANCIS L. MORGAN.